United States Patent [19]

Perreault et al.

[11] Patent Number: 5,651,009
[45] Date of Patent: Jul. 22, 1997

[54] SYSTEM AND METHOD FOR HYBRID CONTENTION/POLLING PROTOCOL COLLISION RESOLUTION USING A DEPTH FIRST SEARCH TECHNIQUE

[75] Inventors: John A. Perreault, Hopkinton; Abhay Joshi; Mete Kabatepe, both of Norwood; Lawrence W. Lloyd, Wrentham; Stephen Schroeder, Stoughton, all of Mass.

[73] Assignee: Motorola, Inc., Schaumburg, Ill.

[21] Appl. No.: 433,876

[22] Filed: May 2, 1995

[51] Int. Cl.$^6$ .................................................. H04L 12/413
[52] U.S. Cl. ................................................ 370/447; 370/449
[58] Field of Search .................................. 370/85.2, 85.3, 370/85.6, 85.7, 85.8, 445, 447, 448, 449; 395/280, 287, 289, 290, 293, 296

[56] References Cited

U.S. PATENT DOCUMENTS 5,090,012  2/1992  Kajiyama et al. ................. 370/85.3
5,392,285  2/1995  Kurts ................................ 370/85.3
5,475,850  12/1995  Kahn ................................ 395/290

*Primary Examiner*—Benedict V. Safourek
*Attorney, Agent, or Firm*—Darleen J. Stockley

[57] ABSTRACT

A method and system provide efficient resolution of transmission collisions in a simultaneous channel access communication environment. At least a first Master device and a plurality of Slave devices utilize the steps of: (1) transmitting, by the plurality of Slave devices upon receiving a contention poll from the first Master device, information to the Master device, wherein transmissions of the Slave devices provide a collision; (2) selecting a subset of Slaves allowed to retransmit following the collision, by the first Master device using a collision resolution poll in accordance with a predetermined depth first tree search technique; and (3) retransmitting, by the subset of Slave devices, the information to the Master device, and, where another collision is obtained, recycling to step 2 and repeating steps 2 and 3 until all collisions are resolved.

10 Claims, 7 Drawing Sheets

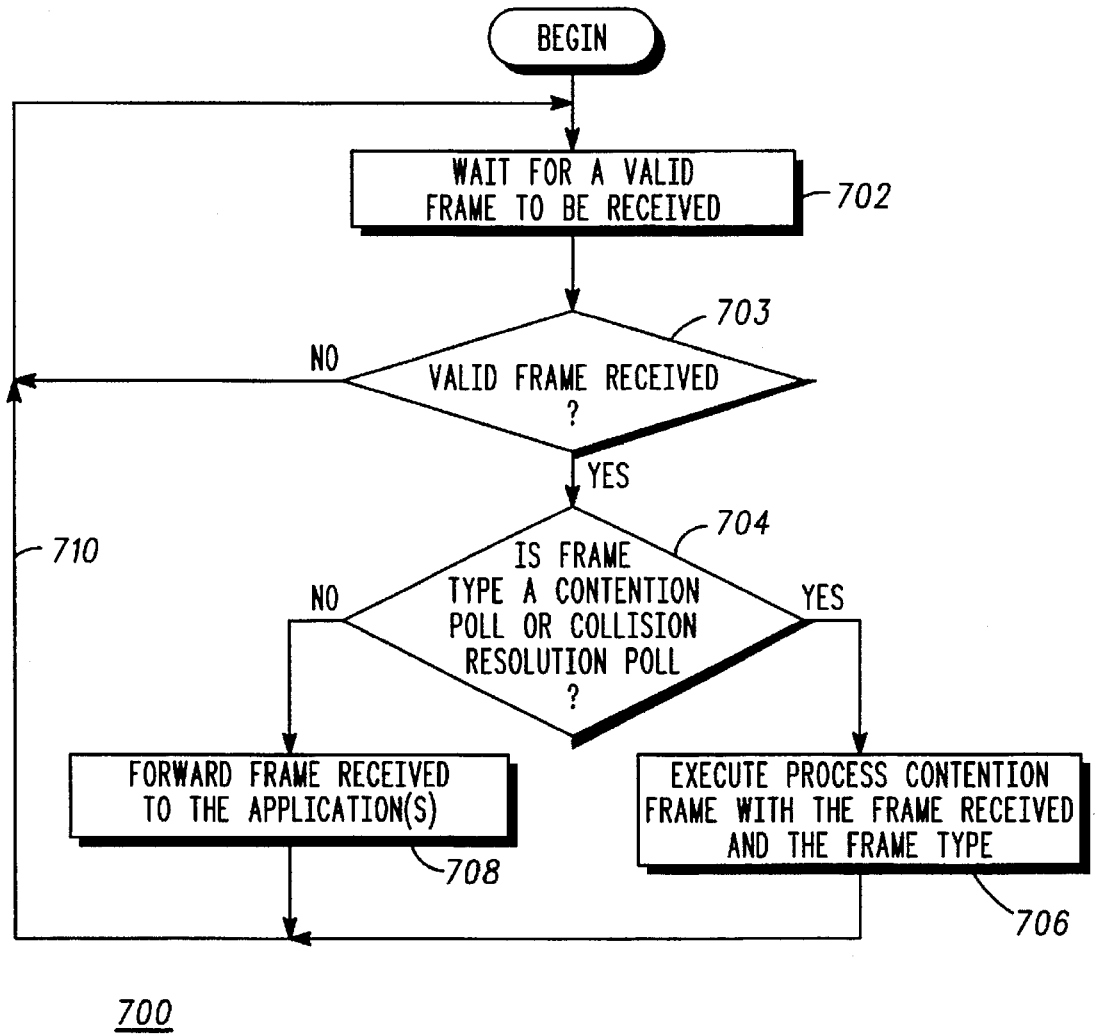
FIG.7
FIG.9
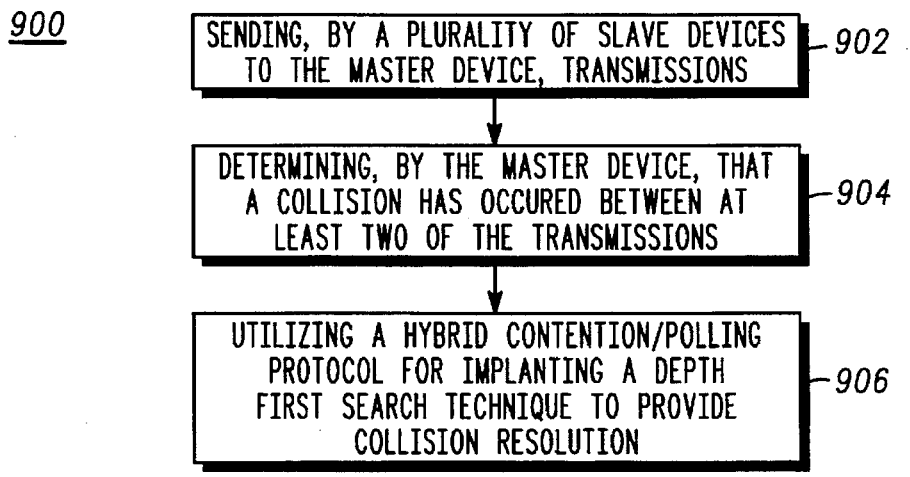

1002 — SETTING BY THE MASTER DEVICE A DYNAMICALLY OR STATICALLY DETERMINED MAXIMUM DEPTH D, D BEING AN INTEGER TO REPRESENT A DEPTH OF A TREE AND A SECOND DYNAMICALLY OR STATICALLY DETERMINED INTEGER VALUE B TO REPRESENT A MAXIMUM NUMBER OF BRANCHES FOR EACH DEPTH LEVEL OF THE TREE

↓

1004 — SELECTING BT THE MASTER DEVICE. A SUBSET OF SLAVES AT A FIRST DEPTH LEVEL AND A BRANCH, WHEREIN EACH SLAVE INVOLVED IN A COLLISION RANDOMLY SELECTS A BRANCH IN AN INTEGER RANGE OF 1-B, THE MASTER DEVICE SELECTS BRANCH VALUE 1 AND THE SUBSET OF SLAVES THAT ARE ALLOWED TO RETRANSMIT FOLLOWING THE COLLISION ARE THOSE SLAVES WHO HAVE SELECTED BRANCH VALUE 1, AND SAID SUBSET OF SLAVES RETRANSMITTING, AND ONE OF:

↓

1006 — WHERE A COLLISION OCCURS, PROCEEDING BY THE MASTER DEVICE TO A NEXT DEPTH LEVEL AND SELECTING BY THE MASTER DEVICE, A SUBSET OF SLAVES AT THE NEXT DEPTH LEVEL, AND A BRANCH, WHEREIN EACH SLAVE INVOLVED IN THE IMMEDIATELY PRECEEDING COLLISION RANDOMLY SELECTS A BRANCH IN AN INTEGER RANGE OF 1-B, THE MASTER DEVICE SELECTS BRANCH VALUE 1 AND THE SUBSET OF SLAVES THAT ARE ALLOWED TO RETRANSMIT FOLLOWING THE COLLISION ARE THOSE SLAVES AT SAID NEXT DEPTH LEVEL WHO HAVE SELECTED BRANCH VALUE1, AND SAID SUBSET OF SLAVES RETRANSMITTING, AND RECYCLING TO ONE OF 1006, 1008

↓

1008 — WHERE TRANSMISSION IS SUCCESSFUL, PROCEEDING BY THE MASTER DEVICE, TO A NEXT BRANCH OF THE SAME DEPTH LEVEL AND SELECTING A SUBSET OF SLAVES AT THE SAME DEPTH LEVEL AND A BRANCH WHEREIN EACH SLAVE INVOLVED IN A COLLISION HAS PREVIOUSLY SELECTED A BRANCH IN AN INTEGER RANGE OF 1-B, THE MASTER DEVICE SELECTS THE NEXT BRANCH VALUE AND THE SUBSET OF SLAVES THAT ARE ALLOWED TO RETRANSMIT FOLLOWING THE COLLISION ARE THOES SLAVES WHO HAVE SELECTED SAME BRANCH AS SELECTED BY THE MASTER DEVICE, AND SAID SUBSET OF SLAVES RETRANSMITTING, AND RECYCLING TO ONE OF 1006, 1008 UNTIL ALL COLLISIONS HAVE BEEN RESOLVED FOR A BRANCH, AND THE MASTER DEVICE RETURNING TO THE PREVIOUS DEPTH LEVEL, AND REPEATING STEP 1008 UNTIL ALL COLLISIONS HAVE BEEN RESOLVED FOR THE TREE.

SYSTEM AND METHOD FOR HYBRID CONTENTION/POLLING PROTOCOL COLLISION RESOLUTION USING A DEPTH FIRST SEARCH TECHNIQUE

CO-PENDING APPLICATIONS

The present application may be related to co-pending applications: U.S. patent application Ser. No. 08/432,749 filed on May 2, 1995 (Docket No. CX095004), entitled METHOD AND APPARATUS FOR A HYBRID CONTENTION AND POLLING PROTOCOL by Abhay Joshi, Mete Kabatepe, Lawrence W. Lloyd, John A. Perreault, and Stephen Schroeder; U.S. patent application Ser. No. 08/433,905 filed on May 2, 1995 (Docket No. CX095005), entitled METHOD AND SYSTEM FOR PROVIDING ACCESS BY SECONDARY STATIONS TO A SHARED TRANSMISSION MEDIUM, by Abhay Joshi, Mete Kabatepe, Lawrence W. Lloyd, John A. Perreault, and Stephen Schroeder now U.S. Pat. No. 5,596,577; U.S. patent application Ser. No. 08/433,877 filed on May 2, 1995 (Docket No. CX095007), entitled METHOD AND APPARATUS FOR MULTILING POLLING, by Abhay Joshi, Mete Kabatepe, Lawrence W. Lloyd, John A. Perreault, and Stephen Schroeder; U.S. patent application Ser. No. 08/433,878 filed on May 2, 1995 (Docket No. CX095008), entitled METHOD AND SYSTEM FOR MANAGEMENT OF FREQUENCY SPECTRUM AMONG MULTIPLE APPLICATIONS ON A SHARED MEDIUM by John A. Perreault, Abhay Joshi, Albert Chen and Eva Labowicz now U.S. Pat. No. 5,608,727; U.S. patent application Ser. No. 08/437,106 filed on May 2, 1995 (Docket No. CX095009), entitled METHOD AND APPARATUS FOR A HYBRID LIMITED CONTENTION AND POLLING PROTOCOL, by Abhay Joshi, Mete Kabatepe, Lawrence W. Lloyd, John A. Perreault, and Stephen Schroeder; and U.S. patent application Ser. No. 08/434,334 filed on May 2, 1995 (Docket No. CX095012), entitled SYSTEM AND METHOD FOR HYBRID CONTENTION/POLLING PROTOCOL COLLISION RESOLUTION USING BACKOFF TIMERS WITH POLLING, by John A. Perreault, Abhay Joshi, Mete Kabatepe, Lawrence W. Lloyd, and Stephen Schroeder.

FIELD OF THE INVENTION

The present invention relates to communication in shared channel environments, and more particularly to collision resolution techniques for communication in shared channel environments.

BACKGROUND

Data to be transmitted in a shared channel environment may typically be "packaged" in frames to facilitate transmission. A frame is a set of consecutive time slots in which the position of each digit time slot is identified by reference to a frame-alignment signal. The frame-alignment signal may not necessarily occur entirely or even in part in each frame.

In shared channel environments having simultaneous channel access, two or more devices may transmit a frame simultaneously, causing collisions. Most protocols in use today use a form of random backoff for resolving these collisions. In random backoff, where devices involved in the collision "hear" the collision as it occurs, the collision is resolved by selecting a random number that controls how long, i.e., what timeout period, a device must wait before retransmitting. "Hear" typically means that a device receiver is tuned to the same channel as the transmissions, the device actually receives its own transmission and recognizes that the message is garbled, e.g., signals received do not match signals transmitted and the device implies a collision from the incorrectly received signals. When the timeout period has been completed, the device retransmits. The retransmitted frame may collide again with frame transmissions from the same device(s) involved in the original collision if the other devices select approximately the same amount of time to wait before retransmitting, or with any other device that coincidentally chooses to transmit. When repeated collisions occur while devices are trying to retransmit, the devices back off longer and longer amounts of time, until a maximum number of retransmission attempts has occurred, at which point the frame is dropped. Under heavy channel loading, the probability of multiple collisions of frames occurring increases to the point of congestion collapse, i.e., very little or no frame traffic is transmitted successfully without collisions.

Further, in some environments, only one "headend Master" device can hear the "upstream" transmissions of the "remote Slave" devices, and all remote Slave devices can hear the "downstream" transmissions of the headend Master (e.g., multidrop modem Wide Area Networks (WANs), coaxial cable CATV WANs, etc.). In this type of environment, one solution is for the headend Master to repeat all remote Slave upstream transmissions by transmitting them downstream, so that those involved in a collision can hear the collision. However, this type of solution uses bandwidth that could more profitably be utilized for downstream transmissions when some or all transmissions are sent beyond a local network (e.g., to destinations in a wide area network).

Thus, in shared channel environments where simultaneous channel access can occur, a system and method are needed for efficiently resolving the resulting collisions when two or more Slave devices transmit simultaneously.

BRIEF DESCRIPTION OF THE DRAWINGS

FIG. 7 is a flow chart of one implementation of the steps of transmitting upon receiving a contention poll from the first Master device and retransmitting, by the subset of Slave devices, the information to the Master device in accordance with the present invention.

FIG. 9 is a flow chart of one embodiment of steps in accordance with the method of the present invention.

FIG. 10 is a flow chart of one embodiment of steps of a depth first tree search that is utilized together with polls for collision resolution in accordance with the present invention.

DETAILED DESCRIPTION OF A PREFERRED EMBODIMENT

Figure 1:
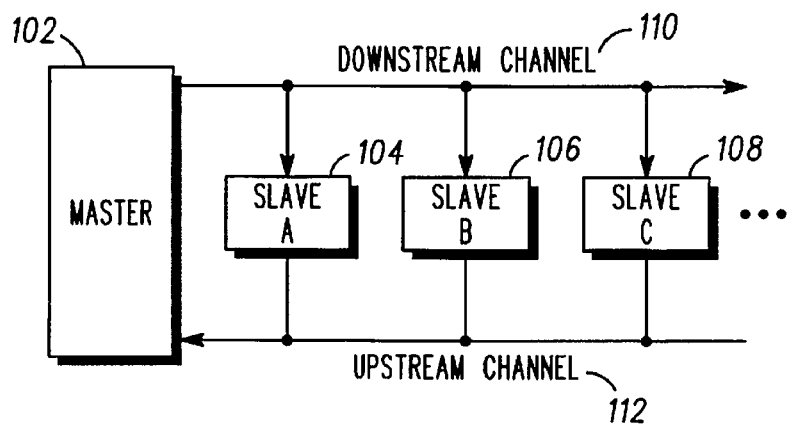
FIG. 1 is a block diagram of a Master/Slave communication system that operates in accordance with the method of the present invention.

The present invention provides a solution to the problem of resolving collisions in an environment where the transmitting devices cannot "hear" collisions without the headend Master repeating transmission of all upstream frames in the downstream direction. Using this invention results in more efficient use of downstream bandwidth. This invention also prevents additional collisions from occurring between a device that is retransmitting due to an earlier collision and a device that is transmitting a frame for the first time. Further, this invention prevents congestion collapse from occurring under heavy channel loading.

Also, this invention provides a solution which prevents additional collisions from occurring between a device that is retransmitting due to an earlier collision, and a device that is retransmitting a frame due to a more recent collision. By preventing additional collisions from occurring between a device that is retransmitting due to an earlier collision and a device that is transmitting a frame for the first time or due to a more recent collision, the present invention prevents congestion collapse from occurring under heavy channel loading.

This invention is particularly well-suited to, although not limited to, environments where there is a single Master transmitter for a plurality of Slave receivers in a downstream direction, and a plurality of Slave transmitters for one Master receiver in an upstream direction (e.g., multidrop modem WANs, coaxial cable CATV WANs, etc.). The plurality of Slave transmitters are allowed to remain simple at the cost of some additional complexity in the single Master transmitter, while at the same time providing an effective collision resolution mechanism. The Master transmitter has the ability to receive transmissions by any of the Slaves on the shared channel in order to detect collisions. The Master transmitter controls transmission by all of the Slaves by transmitting contention polls, which allow all or some subset of the Slaves to transmit, and collision resolution polls which allow only a subset of those Slaves involved in the most recent collision to attempt retransmission.

In the present invention the subset of Slaves allowed to retransmit following a collision is determined using a depth first tree search technique. As collisions occur, the tree is grown "deeper", i.e., to a node at a next depth, with fewer and fewer Slaves allowed to retransmit as the depth increases, and when no collision occurs on a specific branch of the tree, the branch is "pruned", i.e., terminated, and a subset of Slaves for a next branch of the node is permitted, until collisions for all branches of a node have been resolved. Upon resolution of all collisions at a node, collision resolution is continued at a next node at the immediately previous depth, and so on, until all collisions have been resolved. Thus, this process is repeated until only the root of the tree remains, at which point all collisions have been resolved.

FIG. 1, numeral 100, is a block diagram of a Master/Slave communication system that operates in accordance with the method of the present invention. The Master device (102) communicates with the Slave devices (104, 106, 108, . . .) by utilizing a downstream channel (110) and an upstream channel (112) to provide a hybrid contention/polling protocol system that implements a depth first search technique for providing collision resolution.

In FIG. 1, the Master device (102) transmits to all Slave devices, i.e., stations, (104, 106, 108, . . .) on the downstream channel (110) and receives from all Slave devices (104, 106, 108, . . .) on the upstream channel (112). The Slave devices (104, 106, 108, . . .) receive transmissions from the Master device (102) on the downstream channel (110), and transmit to the Master device (102) on the upstream channel (112). The Master device (102) detects and controls the resolution of, upstream channel collisions that occur when two or more Slave devices (104, 106, 108, . . .) transmit coincidentally.

Figure 2:
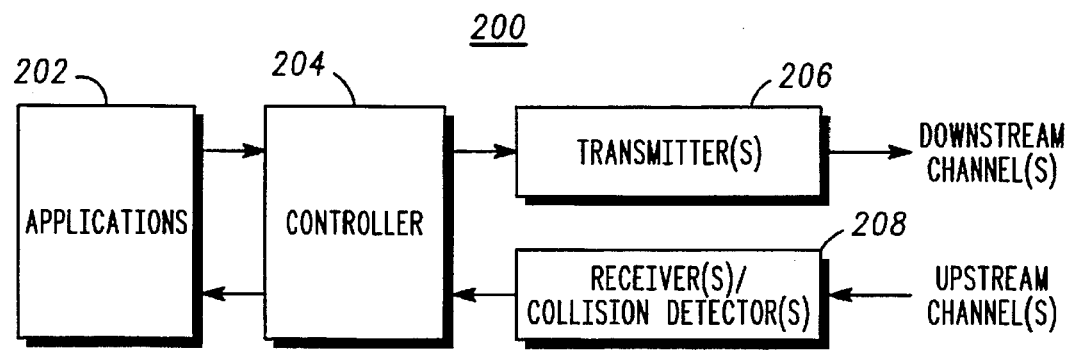
FIG. 2, is a block diagram of a Master device of FIG. 1 that is utilized in accordance with the present invention.

FIG. 2, numeral 200, is a block diagram of a Master device of FIG. 1 that is utilized in accordance with the present invention. The Master device (200) receives upstream channel frames at the receiver(s)/collision detector(s) (208). The receiver(s)/collision detector(s) (208) determine whether there was a collision (typically based on an implication of a collision when a cyclic redundancy code is incorrect), and provide this information to the controller (204). The controller (204) controls Slave device access to the upstream channel based on the receiver(s)/collision detector's information by generating contention polls which allow a subset (which may be the entire set) of the Slave devices to transmit, or collision resolution polls which allow only a subset (which is less than the entire set) of those Slave devices involved in the most recent collision to attempt retransmission. The controller (204) then forwards frames received on the upstream channel without a collision to predetermined applications.

Figure 3:
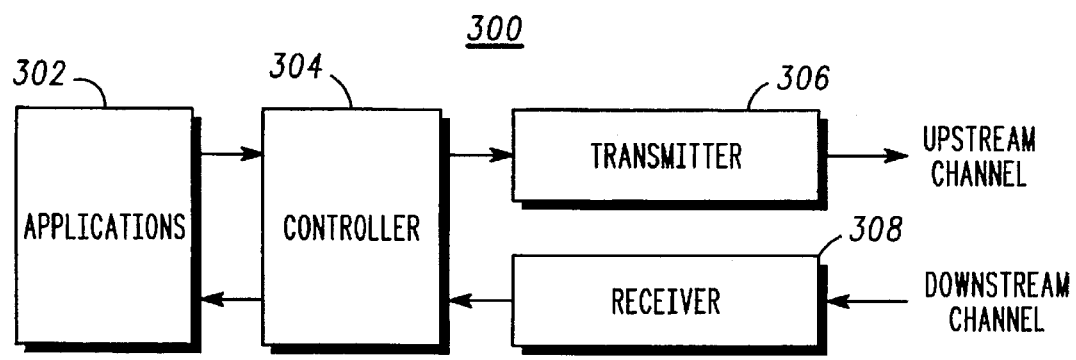
FIG. 3 is a block diagram of a Slave device of FIG. 1 that is utilized in accordance with the present invention.

FIG. 3, numeral 300, is a block diagram of a Slave device of FIG. 1 that is utilized in accordance with the present invention. The Slave device (300) receives downstream channel frames through a receiver (308). The controller (304) of the Slave device determines whether the received frame is a contention poll or collision resolution poll and selects the appropriate response as necessary (i.e., no response, transmission of a new frame, or retransmission of the last frame sent). If a response is to be sent, it is sent to the transmitter (306) of the Slave device for delivery on the upstream channel. If the frame received on the downstream channel is not a contention poll or collision resolution poll, it is sent to the predetermined applications.

Figure 4:
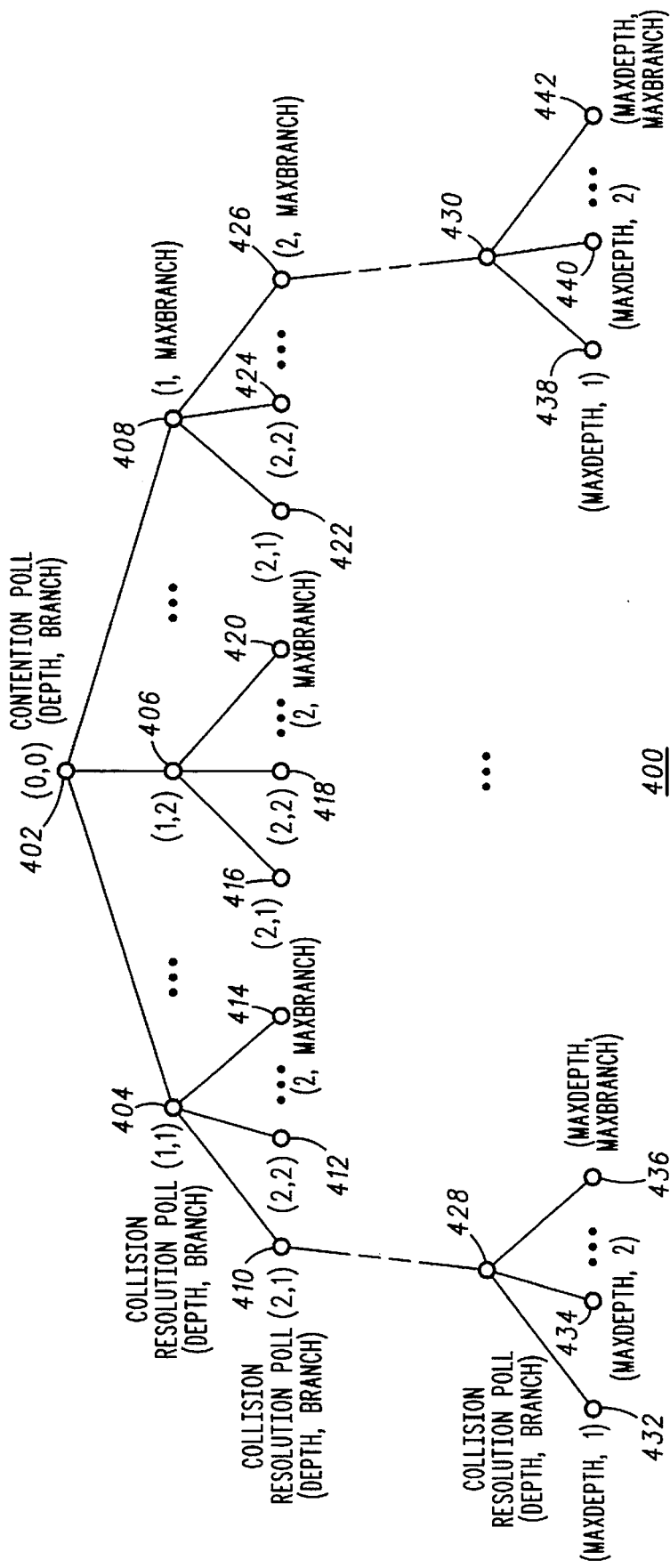
FIG. 4 is a diagram of a collision resolution poll tree structure in accordance with the present invention.

FIG. 4, numeral 400, is a diagram of a collision resolution poll tree structure in accordance with the present invention. Two integer variables are used to control the sequence and termination of the collision resolution procedure, which is based on a depth first tree search technique. The first variable is MAXDEPTH (D), representing a maximum depth that the tree may grow to, which corresponds to the maximum number of consecutive collisions allowed before abandoning the collision resolution procedure and discarding all frames involved in the collision. The second variable is MAXBRANCH (B), representing the maximum number of branches allowed at a vertice (i.e., node) in the tree, which corresponds to the maximum value allowed for a random number that is selected by each Slave device involved in a specific collision in an attempt to differentiate between colliding transmissions of Slave devices in the next retransmission. MAXDEPTH and MAXBRANCH can be chosen dynamically at the time of the collision, or statically, based on the application. In the example of FIG. 4 the root node (402) represents the contention poll that resulted in a collision. There are MAXBRANCH nodes one depth level below (404, 406, . . . , 408), each of which has a plurality of branch nodes (410, 412, . . . , 414; 416, 418, . . . , 420; 422, 424, . . . , 426), and so on, and each node representing a collision resolution poll that will be generated by the Master. Thus, at MAXDEPTH, there are a plurality of branch nodes (432, 434, . . . , 436; 438, 440, . . . , 442) for each next to last branch node (428, . . . , 430).

The Master generates a collision resolution poll with depth=1 and branch=1 (404). Each slave involved in the collision on the previous contention poll, upon seeing the collision resolution poll depth=1 branch=1 (404), selects a random integer number 1 to MAXBRANCH. All slaves that selected branch=1 retransmit immediately, while all other slaves must wait for a collision resolution poll containing depth=1 branch=whatever value the slave randomly selected, e.g., those slaves selecting the random number 2 must wait for a collision resolution poll containing depth=1 branch=2 (406), etc. Suppose that there was a collision on the collision resolution poll containing depth=1 branch=1 (404). There are MAXBRANCH nodes one depth level below (410, 412, . . . , 414), each node representing a collision resolution poll that will be generated by the Master. Each slave involved in the collision on the previous collision resolution poll selects a random integer number 1 to MAXBRANCH. The Master generates a collision resolution poll with depth=2 and branch=1 (410), and all slaves that selected branch=1 respond. This process continues until either no collision is detected or MAXDEPTH is exceeded. If MAXDEPTH is exceeded, the Master stops attempting to resolve the collisions for that branch and colliding frames are discarded by the slaves. If no collision occurs, the master generates a collision resolution poll for each of the nodes at a given depth level, then backs up to the previous depth level and generates a collision resolution poll for the next branch at that level, repeating this process until only the root (402) remains, at which point all collisions have been resolved. For example, after a collision resolution poll with depth=1 branch=1 (404) resulted in a collision, when no collision is detected at depth=2 , branch=MAXBRANCH (414), the Master backs up to depth=(2−1)=1, branch=(1+1)=2 (406), and generates a collision resolution poll with depth=1 branch=2 (406). This process is repeated until no collision is detected at depth=1 branch=MAXBRANCH (408), at which point all collisions have been resolved.

One embodiment of steps in accordance with the method of the present invention is set forth in FIG. 9, numeral 900. The invention provides efficient resolution of transmission collisions in a simultaneous channel access communication system having at least a first Master device and a plurality of Slave devices, and includes the steps of: 1) sending (902), by a plurality of Slave devices to the { Master device, transmissions; 2) determining (904), by the Master device, that a collision has occurred between at least two of the transmissions; and 3) utilizing (906) a hybrid contention/polling protocol for implementing a depth first search technique to provide collision resolution.

The hybrid contention/polling protocol for implementing a depth first search technique typically includes the steps of: 1) sending, by the Master device, a contention poll to the plurality of Slave devices authorizing transmission; 2) determining, by the Master device, whether a timeout has occurred; 3) recycling to step 1 where a timeout has occurred; 4) continuing to step 5 where a timeout fails to occur; 5) determining, by the Master device, whether a transmission has been received; 6) recycling to step 1 where the transmission fails to be received; 7) continuing to step 8 where the transmission is received; 8) determining, by the Master device, whether a collision has occurred; 9) forwarding, by the Master device, the transmission to application(s) where the collision fails to occur, and recycling to step 1; and 10) executing, where a collision occurs, a collision resolution protocol that continues to execute until all collisions that can be resolved are resolved, with depth= 1, and recycling to step 1.

FIG. 10, numeral 1000, is a flow chart of one embodiment of steps of a depth first tree search that is utilized together with polls for collision resolution in accordance with the present invention. The predetermined depth first tree search technique includes the steps of: 1) setting (1002), by the Master device, a dynamically or statically determined maximum depth D, D being an integer, to represent a depth of a tree and a second dynamically or statically determined integer value B to represent a maximum number of branches for each depth level of the tree; 2) selecting (1004), by the Master device, a subset of Slaves at a first depth level and a branch, wherein each Slave involved in a collision randomly selects a branch in an integer range of 1-B, the Master device selects branch value 1 and the subset of slaves that are allowed to retransmit following the collision are those slaves who have selected branch value 1, and said subset of slaves retransmitting and one of 2A–2B:

2A) where a collision occurs, proceeding (1006), by the Master device, to a next depth level and selecting, by the Master device, a first predetermined subset of the next depth level of Slaves at the next depth level and a branch, wherein each slave involved in the immediately preceeding collision randomly selects a branch in an integer range of 1-B, the Master device selects branch value 1 and the subset of slaves that are allowed to retransmit following the collision are those slaves at said next depth level who have selected branch value 1, and said subset of slaves retransmitting and recycling to one of 1006, 1008;

2B) where transmission is successful, proceeding (1008) by the Master device, to a next branch of the same depth level and selecting a subset of slaves at the same depth level and a branch, wherein each slave involved in a collision has previously selected a branch in an integer range of 1-B, the Master device selects the next branch value and the subset of slaves that are allowed to retransmit following the collision are those slaves who have selected the same branch as selected by the Master device, and said subset of slaves retransmitting and recycling to one of 1006 and 1008 until all collisions have been resolved for a branch, and the Master device returning to the previous depth level, and repeating step 1008 until all collisions have been resolved for the tree.

Figure 5:
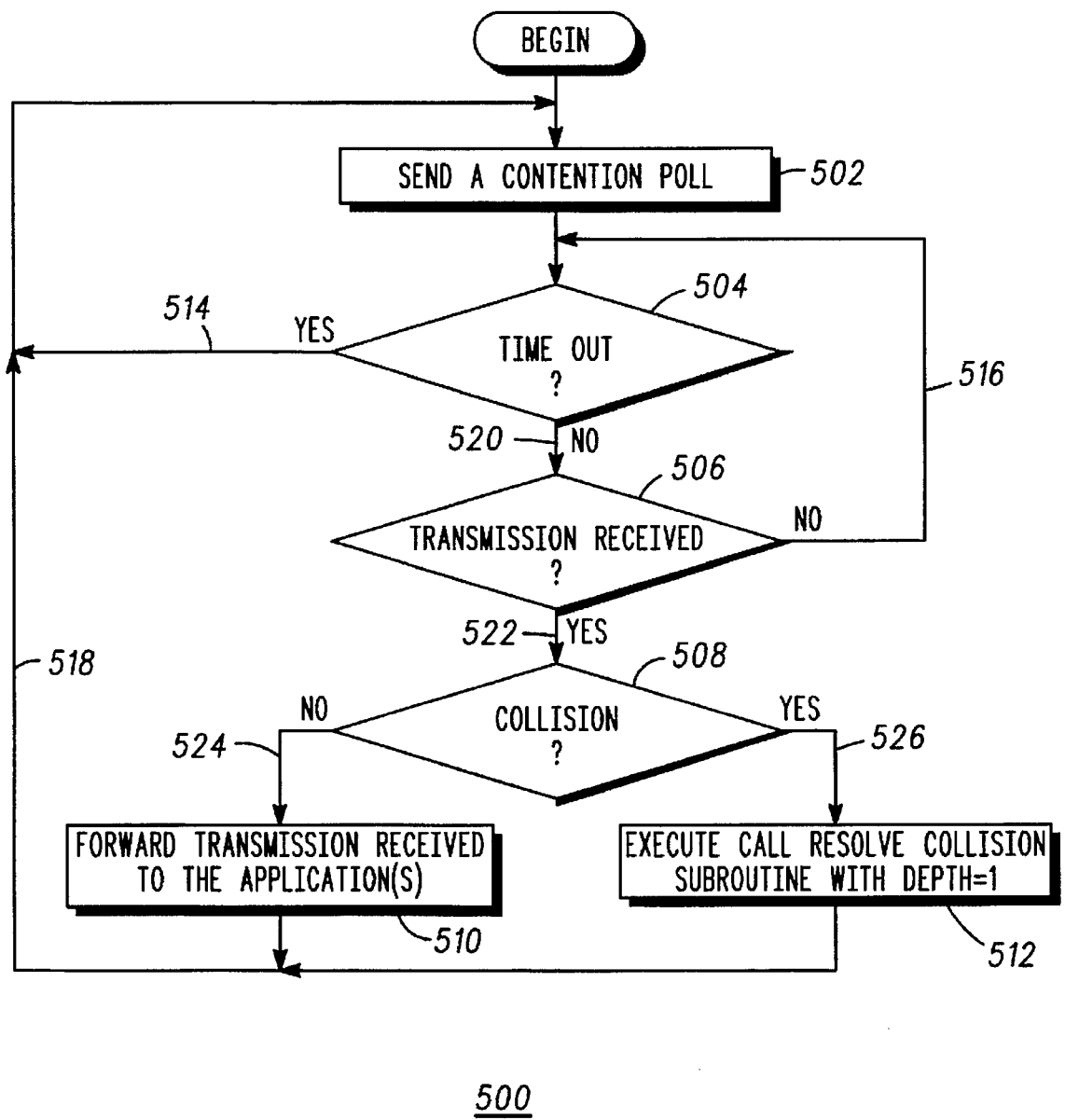
FIG. 5 is a flow chart of steps in accordance with implementation of the method of contention access control of the present invention by the Master device controller.

The Master device controller has logic for controlling access to the upstream channel by Slave devices. The Master device controller also has logic for controlling the resolution of collisions of Slave device transmissions on the upstream channel, should they occur. FIG. 5, numeral 500, is a flow chart of steps in accordance with implementation of the method of contention access control of the present invention by the Master device controller. Thus, the steps implemented by the Master device to provide the contention poll and for selecting, using a collision resolution poll, a subset of Slaves allowed to retransmit following the collision using a predetermined depth first tree search technique, typically include: 1) sending (502) a contention poll to the plurality of Slave devices authorizing transmission; 2) determining (504) whether a timeout has occurred; 3) recycling (514) to step 1 where a timeout has occurred; 4) continuing (520) to step 5 where a timeout fails to occur; 5) determining (506) whether a transmission has been received; 6) recycling (516) to step 4 where the transmission fails to be received; 7) continuing (522) to step 8 where the transmission is received; 8) determining (508) whether a collision has occurred; 9)

forwarding (510), where the collision fails to occur (524), the transmission to application(s) and recycling (518) to step 1; 10) executing (512), where a collision occurs (526), a resolve_collision subroutine with depth=1 that continues to execute until all collisions are resolved, and recycling (518) to step 1.

Figure 6:
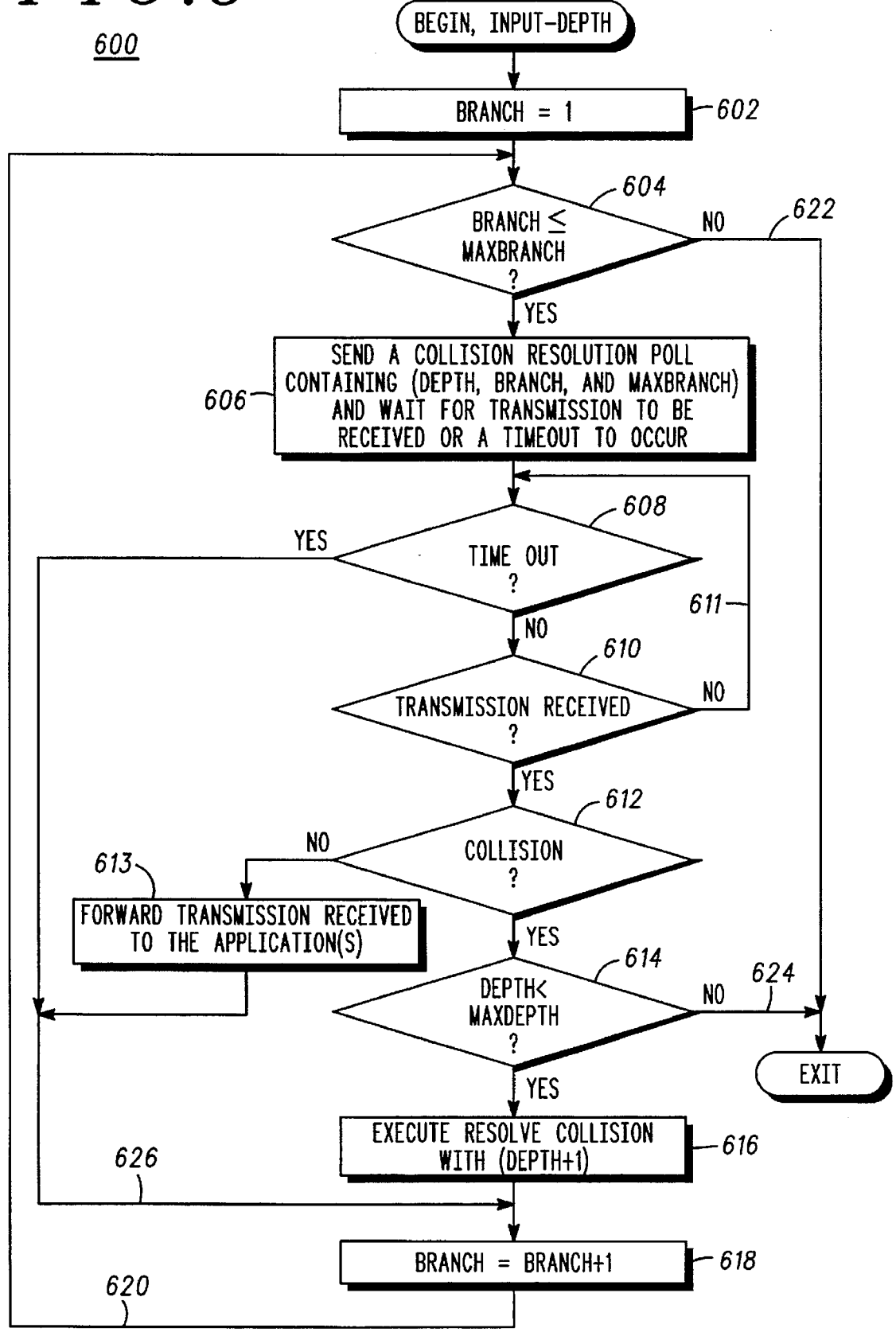
FIG. 6 is a flow chart of steps in accordance with implementation of the method for utilizing a collision resolution protocol of the present invention by the Master device controller.

FIG. 6, numeral 600, is a flow chart of steps in accordance with implementation of the method for utilizing a collision resolution protocol of the present invention by the Master device controller. The Slave device has logic for controlling its access to the upstream channel based upon the receipt of frames on the downstream channel that were transmitted by the Master device. The Slave device also contains logic for recognizing that the Master device is resolving a specific collision that the Slave device was involved in, and for selecting a random number between one and MAX-BRANCH for use in the collision resolution procedure described. Typically, selecting a subset of Slaves allowed to retransmit following the collision, by the first Master device using a collision resolution poll in accordance with a predetermined depth first tree search technique includes the following steps. First, a predetermined depth, i.e., MAXDEPTH, is preselected or dynamically determined and input into the Master device controller. The Master device starts by selecting (602) branch=1 and determines (604) whether the branch is less than or equal to a preselected or dynamically determined maximum branch value B (MAXBRANCH), B an integer. Where the branch is greater than B, the Master device exits (622) the step of resolving the collision, and where the branch is an integer value 1<branch<B, the Master device sends (606) a collision resolution poll having a depth and a branch and a MAXBRANCH, wherein the depth is initially set to 1 and, as the present protocol is implemented, is incremented during each recursion, to a maximum of D, D being an integer value between 1 and MAXDEPTH, and depth being a level of a tree of the predetermined depth first tree search, and branch is incremented during each recursion to a maximum of MAXBRANCH, and waits for a frame to be received or for a predetermined timeout period to elapse. MAXBRANCH may be a preselected constant value or may be selected to be a different value for each collision poll.

Next, the Master device determines whether a predetermined timeout period has elapsed (608). Where the timeout period has elapsed, the Master device proceeds to set branch equal to branch+1 (618) and proceeds as further detailed below. Where the Master device determines that a timeout period has failed to elapse, the Master device determines whether a transmission has been received (610). Where a transmission fails to be received and the predetermined timeout period has elapsed, the Master device sets (618) branch=branch+1 and recycles (620) to determining whether branch is less than or equal to a predetermined maximum branch value B. Where a transmission is received, the Master device determines (612) whether a collision has occurred and where a collision fails to occur forwards the transmission received to the application (613), sets (618) branch=branch+1 and recycles (620) to determining whether branch is less than or equal to the predetermined maximum branch value B. Where a collision occurs, the Master device determines (614) whether depth is less than D. Where depth is greater than or equal to D, the Master device exits (624) the step of selecting a subset of Slaves, and where depth is less than D, the Master device sets depth=depth+1 and executes (616) the recursive resolve_collision subroutine. Upon exiting the recursive resolve_collision subroutine of FIG. 6, one exits to step 618, sets (618) branch=branch+1, and recycles (620) to determining whether branch is less than or equal to the predetermined maximum branch value B. In one implementation, the resolve_collision subroutine may utilize a stack (where the stack has a depth of D) recursively until transmission fail to collide, and then proceed to the step of increasing branch to branch+1 (618). Upon exiting the resolve_collision subroutine of FIG. 6 after all collisions have been resolved, one exits to FIG. 5, step 518. A transmission is typically a frame or packet.

Typically, as set forth in FIG. 7, numeral 700, the steps of transmitting, by the plurality of Slave devices upon receiving a contention poll from the first Master device and retransmitting, by the subset of Slave devices, the information to the Master device include the following steps. The Slave device waits (702) for a valid frame to be received. Where a valid frame fails to be received (703), the Slave device recycles (710) to waiting for a valid frame to be received. Where a valid frame is received (703), the slave device determines (704) whether the frame is one of: a contention poll and a collision resolution poll. Where one of a contention poll and a collision resolution poll fails to be received, the Slave device forwards the frame received to the applications (708) and recycles (710) to waiting for a valid frame to be received. Where a valid frame, one of a contention poll and a collision resolution poll is received, the Slave device executes a process_contention_frame subroutine (706) (see FIG. 8) providing the received valid frame, referred to herein as frame_received and providing said frame_received type, one of: a contention poll and a collision resolution poll, referred to herein as frame_type, and recycles (710) to waiting for a valid frame to be received.

Figure 8:
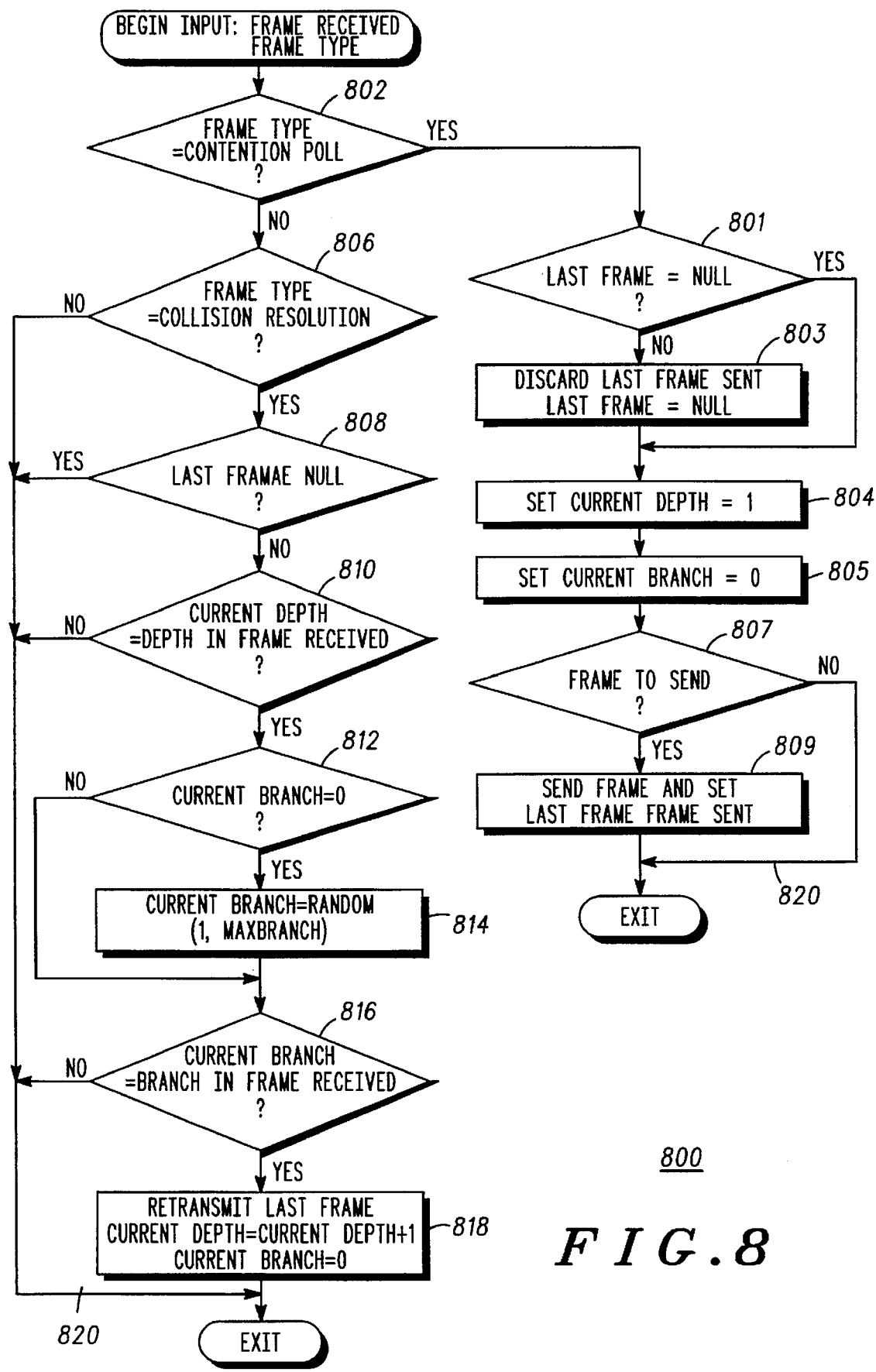
FIG. 8 is a flow chart of one implementation of the steps utilized by the Slave .device controller in executing the process_contention_frame subroutine in accordance with the present invention.

The Slave device controller (304), in executing the process_contention_frame subroutine typically implements the steps shown in FIG. 8, numeral 800. The Slave device controller receives the frame_received (i.e., the message itself) and frame_type information (i.e., whether a contention poll or a collision poll) and determines (802) whether frame_type=contention poll. Where the frame_type=contention poll, the Slave device controller determines (801) whether last_frame=NULL. Where last_frame fails to be equal to NULL, the Slave device controller discards the last frame sent and sets last_frame=NULL (803). Where last_frame is equal to NULL or immediately after setting (803) last frame=NULL, the Slave device controller sets current_depth=1 (804), sets current_branch=0 (805), determines whether another frame is to be sent (807), where all frames have been sent, exits, and sends a frame when another frame remains to be sent and sets last_frame=frame_sent (809), and exits (820). Where the frame_type is a non-contention poll, the Slave device controller determines (806) whether the frame_type is a collision resolution poll. Where the frame_type is a non-collision resolution poll, the Slave device controller exits (820), and where the frame_type is a collision resolution poll, the Slave device controller determines (808) whether last_frame=NULL. Where last_frame=NULL, the Slave device controller exits (820), and where last_frame fails to be NULL, the Slave device controller determines (810) whether current_depth= depth in frame_received. Where current_depth fails to be equal to depth in frame_received, the Slave device controller exits (820), and where current_depth=depth in frame_received, the Slave device controller determines (812)

whether current_branch=0 and where current_branch=0, the Slave device controller sets (814) current_branch= random (1, B). Random (1,B) is a subroutine call to a standard subroutine to generate a random integer number between 1 and B inclusive. Where current_branch is unequal to 0 or immediately after setting (814) current_ branch=random (1 ,B), the Slave device controller determines (816) whether current_branch=branch in frame_ received. Where current_branch fails to equal branch in frame_received, the Slave device controller exits (820), and where current_branch=branch in frame_received, the Slave device controller retransmits (818) last_frame, sets current_depth=current_depth+1, and sets current_branch= 0, and then exits (820). p The hybrid contention/polling protocol system of the present invention utilizes the depth first search technique described above for providing collision resolution for collisions of transmissions in a shared channel environment. As shown in FIG. 1, the system includes a plurality of Slave devices and at least a first Master device coupled by upstream channel(s) and downstream channel(s). The hybrid contention/polling protocol incudes: 1) transmitting, by the plurality of Slave devices upon receiving a contention poll from the first Master device, information to the Master device, wherein transmissions of the Slave devices provide a collision; 2) selecting a subset of Slaves allowed to retransmit following the collision, by the first Master device using a collision resolution poll in accordance with a predetermined depth first tree search technique; and 3) retransmitting, by the subset of Slave devices, the information to the Master device, and, where another collision is obtained, recycling to step 2 and repeating steps 2 and 3 until all collisions are resolved.

The predetermined depth first tree search technique utilized by the hybrid contention/polling protocol system is described above. Similarly, the steps implemented by the Master device to provide the contention poll and for selecting, using a collision resolution poll, a subset of Slaves allowed to retransmit following the collision using a predetermined depth first tree search technique, are set forth above. Also the steps for transmitting, by the plurality of Slave devices upon receiving a contention poll from the first Master device and retransmitting, upon receiving a collison resolution poll from the first Master device, by the subset of Slave devices, the information to the Master device are as described above.

We claim:

1. A method of providing efficient collision resolution for transmissions that collide in a simultaneous channel access communication system having at least a first Master device and a plurality of Slave devices, the method comprising the steps of:

14A) sending, by the Master device to the Slave devices, a contention poll authorizing at least two of the Slave devices to transmit on the simultaneous channel access communication system, wherein the contention poll represents an initial search depth;

14B) sending, by at least two of the Slave devices, transmissions on the simultaneous channel access communication system;

14C) detecting, by the Master device, that a collision occurred between the transmissions of a group of at least two of the Slave devices; and 14D) resolving the collision between said group of colliding Slave devices using a hybrid contention/polling protocol comprising the steps of:

14D1) incrementing the search depth;

14D2) dividing the group of colliding Slave devices into a predetermined number of subgroups, where each subgroup includes zero or more Slave devices, and wherein each subgroup is identified by a branch number;

14D3) recursively, for each subgroup, providing the Slave devices in the subgroup an opportunity to retransmit;

14D4) when a collision occurs for the subgroup, recursively cycling to step 14C1 and performing collision resolution using the subgroup as the group; and 14D5) when the subgroup is free from collisions, terminating collision resolution for the subgroup.

2. The method of claim 1 wherein dividing each group of colliding Slave devices comprises:

selecting, by each Slave device, a branch number in the range one to the predetermined number, where the branch number indicates one of the number of subgroups.

3. The method of claim 2 wherein providing the Slave devices in the subgroup an opportunity to transmit comprises:

sending, by the Master device to the Slave devices, a collision resolution poll indicating the search depth and the branch number for the subgroup.

4. The method of claim 3 wherein, upon receipt of the collision resolution poll by the Slave devices, each Slave device having its branch number equal to the branch number specified in the collision resolution poll and having transmitted, at a search depth one less than the search depth specified in the collision resolution poll retransmits.

5. The method of claim 1 further comprising the step of, following incrementing the search depth, terminating collision resolution where the search depth exceeds a predetermined maximum search depth.

6. A hybrid contention/polling protocol system comprising:

at least one Master device; and a plurality of Slave devices responsive to poll messages sent by the Master device on a downstream channel for transmitting messages to the Master device on an upstream channel shared by the plurality of Slave devices, wherein:

the Master device sends a contention poll to the Slave devices authorizing at least two of the Slave devices to transmit on the shared channel, wherein the contention poll represents an initial search depth;

at least two of the Slave devices send transmissions on the shared channel;

the Master device detects that a collision occurred between the transmissions of a group of at least two of the Slave devices; and the collision between the group of colliding Slave devices is using a hybrid contention/polling protocol comprising the steps of:

19D1) incrementing the search depth;

19D2) dividing the group of colliding Slave devices into a predetermined number of subgroups, where each subgroup includes zero or more Slave devices, and wherein each subgroup is identified by a branch number;

19D3) recursively, for each subgroup, providing the Slave devices in the subgroup an opportunity to retransmit;

19D4) when a collision occurs for the subgroup, recursively cycling to step 6C1 and performing collision resolution using the subgroup as the group; and 19D5) when the subgroup is free from collisions, terminating collision resolution for the subgroup.

7. The method of claim 6 wherein dividing each group of colliding Slave devices comprises:

selecting, by each Slave device, a branch number in the range one to the predetermined number, where the branch number indicates one of the number of subgroups.

8. The method of claim 7 wherein providing the Slave devices in the subgroup an opportunity to transmit comprises:

sending, by the Master device to the Slave devices, a collision resolution poll indicating the search depth and the branch number for the subgroup.

9. The method of claim 8 wherein, upon receipt of the collision resolution poll by the Slave devices, each Slave device having its branch number equal to the branch number specified in the collision resolution poll and having transmitted at a search depth one less than the search depth specified in the collision resolution poll retransmits.

10. The method of claim 6 further comprising the step of, following incrementing the search depth, terminating collision resolution where the search depth exceeds a predetermined maximum search depth.

* * * * *

UNITED STATES PATENT AND TRADEMARK OFFICE
CERTIFICATE OF CORRECTION

PATENT NO. : 5,651,009
DATED : Jul. 22, 1997
INVENTOR(S) : John A. Perreault, Hopkinton, Mass.

It is certified that error appears in the above-indentified patent and that said Letters Patent is hereby corrected as shown below:

In claim 6, line 19, insert --resolved-- following the word "is."

Signed and Sealed this

First Day of December, 1998

Attest:

BRUCE LEHMAN

Attesting Officer

Commissioner of Patents and Trademarks